United States Patent [19]

Jaffe

[11] Patent Number: 4,844,742
[45] Date of Patent: Jul. 4, 1989

[54] SURFACE MODIFIED PIGMENT COMPOSITIONS

[75] Inventor: Edward E. Jaffe, Wilmington, Del.

[73] Assignee: Ciba-Geigy Corporation, Ardsley, N.Y.

[21] Appl. No.: 51,098

[22] Filed: May 15, 1987

Related U.S. Application Data

[63] Continuation-in-part of Ser. No. 849,338, Apr. 8, 1986, abandoned.

[51] Int. Cl.$^4$ ................................................. C09C 1/36
[52] U.S. Cl. .................................. 106/448; 106/497; 524/87; 524/507; 548/512
[58] Field of Search ............... 106/288 Q, 309, 308 M; 524/87, 507; 548/512

[56] References Cited

U.S. PATENT DOCUMENTS

| | | | |
|---|---|---|---|
| 2,761,868 | 9/1956 | Lacey | 8/661 |
| 3,836,379 | 9/1974 | Kirsch et al. | 106/288 Q |
| 3,850,654 | 11/1974 | Jaffe | 106/288 Q |
| 3,904,562 | 9/1975 | Hopfenberg et al. | 106/288 Q |
| 4,004,940 | 1/1977 | Cormier | 106/288 Q |
| 4,023,981 | 5/1977 | Perronin et al. | 106/308 N |
| 4,032,698 | 6/1977 | Ashe | 525/126 |
| 4,064,129 | 12/1977 | Gerson et al. | 106/288 Q |
| 4,155,892 | 5/1979 | Emmons et al. | 524/507 |
| 4,197,404 | 4/1980 | Johnson | 106/288 Q |
| 4,256,507 | 3/1981 | Kranz et al. | 106/288 Q |
| 4,325,862 | 4/1982 | Schuster | 524/87 |
| 4,417,013 | 11/1983 | Schuster | 524/87 |
| 4,455,173 | 6/1984 | Jaffe | 106/309 |
| 4,647,647 | 3/1987 | Haubennestel et al. | 528/83 |
| 4,732,618 | 2/1988 | Spietschka et al. | 106/288 |
| 4,762,752 | 8/1988 | Haubennestel et al. | 428/407 |

FOREIGN PATENT DOCUMENTS

| | | |
|---|---|---|
| 154678 | 9/1985 | European Pat. Off. . |
| 8603762 | 7/1986 | PCT Int'l Appl. . |
| 8603763 | 7/1986 | PCT Int'l Appl. . |

*Primary Examiner*—Paul Lieberman
*Assistant Examiner*—Willie J. Thompson
*Attorney, Agent, or Firm*—Harry Falber

[57] ABSTRACT

Surface modification of a variety of pigments, particularly quinacridone pigments, and the pigments resulting therefrom whereby the pigment is treated with a solvent-free, basic, nitrogen-containing copolymer of the polyurethane series and with a dispersion-improving derivative of the primary pigment resulting in compositions exhibiting enhanced performance in automative and other finish systems.

13 Claims, No Drawings

SURFACE MODIFIED PIGMENT COMPOSITIONS

RELATED APPLICATIONS

This application is a continuation-in-part of application Ser. No. 849,338, filed Apr. 8, 1986, now abandoned.

The present invention relates to surface modification of quinacridone, pyrrolopyrrole and other pigments in order to enhance their performance in modern automotive and other finish systems. In particular, the pigments are modified by treatment with a copolymer which serves to enhance the interaction of the pigment with the dispersion system, including the vehicle (resin) and solvent(s) which make up the dispersion medium, and with a derivative of the same pigment. This pigment modification leads to improved rheological characteristics of the dispersion, thus affording greater pigment concentrations and lower solvent emissions to the atmosphere during paint application. In addition, the modified products afford gloss and distinctness of image or mirror quality improvement to automotive and other similar finishes.

The modification of pigments by treating their surface with their own derivatives, forming blended pigment compositions, and the like, is well known in the art. For example, phthalimidomethylation of copper phthalocyanine is described in U.S. Pat. No. 2,761,868, and phthalimidomethyl quinacridone preparation and use is described in U.S. Pat. No. 3,275,637. Similarly, the preparation and use of sulfonated quinacridones is described in U.S. Pat. No. 3,386,843. Phthalimidomethylation of indanthrone, flavanthrone, pyranthrone, and perylenes is further described in U.S. Pat. No. 4,256,507. The use of these treating agents has a definite beneficial effect on rheology and finish appearance in some systems.

Frequently, performance of such treated pigments is system dependent, that is performance is affected by the type of vehicle (resin) and type of solvents used. For some systems, surface treatment of pigment with one of the derivatives mentioned earlier is not necessary. For other systems, even surface treated pigments do not perform adequately. This is particularly the case in modern high solids, low solvent systems, where pigment and system compatibility must be of a particularly high order to obtain finishes with high gloss and distinctness of image.

In seeking to alleviate this variability and obtain consistency of performance in certain paint systems, various polymeric products have been suggested for use. Thus, it was found that enhancement of these properties in certain paint systems could be achieved by the introduction unto a pigment treated with its own derivative of a polymeric dispersant which helps in stabilizing a dispersion, keeping it substantially deflocculated, thus affording lower viscosity and ultimately better finish appearance performance.

As representative of this group of polymeric dispersants, reference is made to basic nitrogen-containing copolymers of the polyurethane series as described in European No. 154,678, as particularly reflected in a commercially available polymeric material sold under the mark DISPERBYK 160 by BYK-Chemie and to chemical variations thereof in terms of molecular weight and the nature of the molecular moieties. This product is recommended as an additive in paint dispersion preparation in the form of a solution in xylene/butyl acetate, primarily the xylene solvent system in which said polymer is believed to be prepared. The presence of the polymer in solvent systems is generally reflective of all such materials.

However, the use of such solution form presents several problems. It requires the paint manufacturer to add another ingredient during dispersion preparation without having any control over the solvents going into the making of the dispersion. Since solvents frequently play a key role in the total stability of a given dispersion, such lack of control is particularly disadvantageous. In some cases, solvent incompatibility would preclude the use of currently available polymers. Consequently, it was necessary to find a way to introduce the copolymer into the pigment to obtain the beneficial properties thereof and at the same time avoid the use of solvents as an extra and frequently complicating ingredient in pigment dispersion preparation.

In addition, PCT applications No. Wo. 86/03762 and No. WO 86/03763 disclose the addition of copolymers of the polyurethane series to pulverulent pigments, including quinacridone pigments, to improve rheological properties. However, additional improvement in rheological and finish properties was still envisioned.

Accordingly, it is the primary object of this invention to provide polymer-containing pigment compositions which exhibit improved rheological and finish characteristics.

It is a further object to provide such pigment compositions without the presence therein of a multiplicity of solvents, so as to avoid the various difficulties encountered with such solvents.

Various other objects and advantages of this invention will become apparent from the following description thereof.

It has now been determined that by treating a primary pigment with a nitrogen-containing copolymer of the polyurethane series, in the substantial absence of solvents, and with a dispersion-improving derivative of the primary pigment, significantly improved pigment systems are obtained. Thus, it has been found that the copolymer, optionally dissolved in a water-soluble diluent for ease of addition, can be introduced into an aqueous suspension of a pigment, whereupon the polymer comes out of solution and being organophilic associates itself with the pigment. The isolated pigment, which is extended with the copolymer, performs in a finish as well as pigments prepared with separately added solutions of the copolymer to the dispersion when the copolymer solvents are totally compatible with the system. Thus, no extra solvents nor an extra addition step are required to achieve the desired improvements in rheology, gloss and distinctness of image. Products prepared by this approach perform very well in a series of paint systems but particularly in alkyd and polyester systems. As noted, the improved products require no additional additives or solvents, all requirements having been built into a given pigment.

For purposes of this invention, the preferred primary pigments are gamma-quinacridone and 1,4-diketo-pyrrolopyroles, with gamma-quinacridone

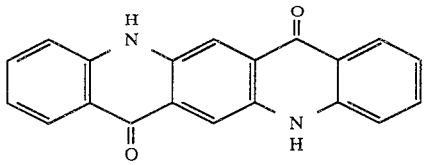

being especially preferred. It should be noted, however, that other suitable organic pigments may include alpha and β-quinacridones, substituted quinacridones, solid solutions of quinacridones, phthalocyanines, indanthrones, isoindolinones, flavanthrones, pyranthrones, thioindigo, perylenes, mono- and dis-azo pigments and the like.

Preferred 1,4-diketo-pyrrolopyrroles correspond to the formula

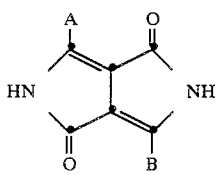

wherein A and B independently are phenyl or phenyl substituted by halogen, $C_1$-$C_6$alkyl, $C_1$-$C_6$alkoxy, $C_1$-$C_6$alkylmercapto, trifluoromethyl, cyano, dimethylamino, diethylamino, $C_2$-$C_6$alkoxycarbonyl, acetylamino, carbamoyl or sulfamoyl. The most preferred 1,4-diketo-pyrrolopyrroles are those wherein A and B independently are phenyl or p-chlorophenyl.

The dispersion-improving derivatives of the primary pigments are known to those skilled in the art. Typical derivatives include, for example, the mono-, di-, tri- and tetra-phthalimidomethyl, o-carboxybenzamidomethyl and sulfonic acid derivatives. For purposes of this invention, the phthalimidomethyl and sulfonic acid derivatives are preferred for use. The preparation of such derivatives are disclosed, for example, in U.S. Pat. Nos. 2,761,868, 3,275,637, 3,386,843 and 4,256,507. The phthalimidomethyl compounds may be characterized by the formula

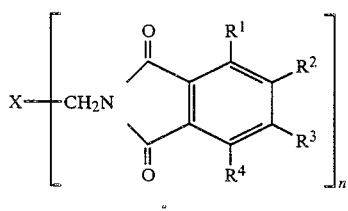

wherein X is the molecular moiety of the desired pigment, $R^1$, $R^3$ and $R^4$ are independently hydrogen or halogen, $R^2$ is hydrogen, halogen, carboxyl, nitro, N-($C_1$-$C_5$)alkylcarbamyl, N-phenylcarbamyl or benzoylamino and n is 1-4. Sulfonates may correspond to the formula $$X-(SO_3M)m$$

wherein X is the molecular moiety of the desired pigment, m is 1-2 and M is hydrogen or a metal ion. These patents and the disclosures therein are deemed to be part of and fully incorporated into the instant specification.

The basic nitrogen-containing copolymer of the polyurethane series is generally a higher molecular weight copolymer with functional groups having a strong affinity for pigments. The copolymer can vary in molecular weight but will generally have an amine value ranging from 5-15 mg KOH/g, and preferably 10-12/mg-KOH/g. Such nitrogen-containing copolymers are described in European No. 154,678 as resulting from the sequential reaction of a polyisocyanate with an average of 2.5-6 functional groups with (a) an aliphatic or cycloaliphatic monohydroxy compound or an ether- or carboxy-substituted aliphatic, cycloaliphatic or aromatic monohydroxy compound in a concentration sufficient to react with 15-50% of the NCO groups;

(b) a polymeric hydroxy or amino compound of the formula $$G-(E)_n$$

wherein E is —OH, —$NH_2$ or —NH($C_1$-$C_4$alkyl), n is 2 or 3, and G is an aliphatic, cycloaliphatic or aromatic group optionally containing —O—, —COO—, —CONH—, —S— or —$SO_2$— groups, in an amount to convert an additional 15-45% of the NCO groups; and (c) a compound of the formula $$Z-Q$$

wherein Q is —OH, $NH_2$, —NH($C_1$-$C_4$ alkyl) or —SH, and Z is a $C_2$-$C_{10}$ aliphatic group with at least one tertiary amino group or a heterocyclic group with at least one basic ring nitrogen not attached to a hydrogen atom, optionally linked to Q through a $C_1$-$C_{10}$ alkylene group, to the elimination of all NCO groups.

Specific examples of each of the defined groups are to be found in European No. 154,678, the descriptive material thereof being deemed to be fully incorporated herein. Representative materials are polyisocyanate of the formula

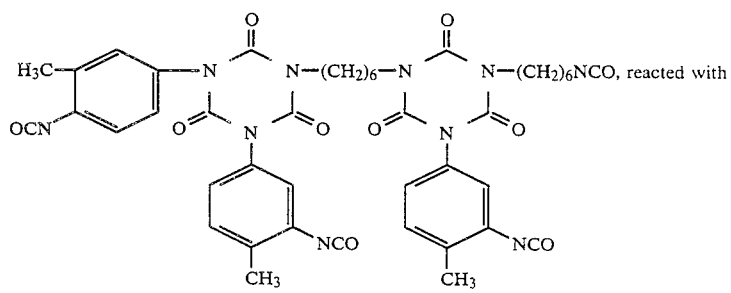

component (a) as ethylene glycol monoacetate, component (b) as polyethylene glycol or caprolactone polyester, and component (c) as 4-(2-hydroxyethyl)pyridine. A typical copolymer is represented by DISPERBYK-160 from BYK-Chemie. The product is identified in the literature as a wetting and dispersing additive for organic pigments, said pigments to be applicable for use in a broad range of industrial paints and coatings. The product is alleged to improve wetting and color strength stabilization and to prevent the reflocculation and/or co-flocculation of pigments. It is to be noted that this copolymer is present to the extent of about 30%, by weight, in a xylene/butyl acetate solvent system and is recommended for use in such solvent system.

For purposes of the instant invention, however, the copolymer is not present in a solvent system. Rather, the copolymer is utilized as a solid or a solution of the dry copolymer in a water-soluble diluent such as acetone, methyl ethyl ketone, and the like, to facilitate copolymer introduction onto the pigment surface.

With regard to the copolymer, it can be isolated from the solvent by distillation, leaving the desired polymer in quantitative yield as a colorless, crystalline solid, which is sufficiently high melting to allow pulverization to a very fine powder. The removal of the solvent is best accomplished under vacuum of about 10 mm Hg and a temperature of 50° to 60° C., although other conditions may be utilized. The solid polymer can be dissolved, for example, in acetone and aqueous slurries of pigment treated with it. When the acetone solution comes in contact with water, the polymer precipitates out in a fine state of subdivision; and without xylene being present, the interaction with the pigment particles is even more effective. The absence of xylene makes pigment isolation and washing considerably easier. Even more simply, the dry polymer can be co-pulverized and throughly blended with a pigment the surface of which has already been pretreated with the special treating agents. Since the polymer will dissolve, at last in part, in most solvents used in dispersion preparation, its interaction with the pigment surface will generally occur during pigment dispersion preparation.

The compositions of this invention are prepared by dispersing the primary pigment, generally in presscake form, in water and then adding an aqueous suspension of the pigment derivative thereto. Adequate stirring is necessary to provide a proper slurry. The copolymer dissolved in acetone is slowly added to the slurry which is kept at room temperature or heated to a maximum of about 50° C. The slurry is maintained for an adequate period of time, e.g. 30 to 60 minutes, in order to insure adequate distribution of the copolymer. The resulting pigment is then isolated by conventional means.

A dry preparative approach is also applicable wherein the isolated and dried pigment, pigment derivative and nitrogen-containing copolymer are thoroughly blended to provide a homogeneous system.

Regarding concentrations, the pigment derivative is present in an amount of from about 1 to 10%, by weight of primary pigment, and preferably from about 2 to 6%. Correspondingly, the copolymer is present in an amount of from about 3 to 20%, by weight of primary pigment, preferably 5 to 10%. Lesser amounts of copolymer do not provide the desired rheology improvement of the dispersion and gloss and distinction of image in the final finish, while excess amounts do not provide the added benefit to warrant the added cost and tend to decrease the strength of the pigment.

As previously noted, the pigment compositions are useful in a wide variety of industrial paints and coatings, such as automotive finishing and refinishing paints based on alkyd/melamine, acrylic/melamine, acrylic/isocyanate, saturated polyesters, in both conventional and high solids form, containing conventional additives. The pigment modification leads to improved rheological characteristics of the dispersion, thus affording greater pigment concentrations and lower solvent emissions to the atmosphere during paint application. In addition, the modified products afford gloss and distinctness of image or mirror quality improvement of the automotive or other similar finishes.

The following examples further illustrate the preferred embodiments of this invention. In these examples, all parts given are by weight unless otherwise noted.

EXAMPLE 1

This example illustrates the preparation of a typical modified pigment system of this invention.

To 6820 parts of water is added 2640 parts of gamma quinacridone (QA) aqueous presscake containing 25.8% solids, by weight, or 681 parts of pigment. The slurry is stirred to complete uniformity. Thereafter, 20.43 parts of 2-phthalimidomethylQA dispersed in 270 parts water is added and stirring is continued for 30 minutes. A solution of 41.2 parts solid, dry copolymer (Disperbyk 160 from BYK-Chemie) dissolved in 144 parts of acetone is then added uniformly with effective stirring over a period of one hour. After completion of the addition, stirring is continued for an additional half hour. The pigment is isolated by filtration and washed with room temperature water until the filtrate shows a resistivity equal to 95% of the wash water. The product is dried at 80° C. to constant weight and then pulverized.

In order to determine the performance characteristics thereof, the pigment is dispersed in a conventional manner in an alkyd paint system (a) (Setal 84 from Kunstharfabriek Synthesis B.V., Holland) and the resulting millbase containing 12.5%, by weight, modified pigment, 54.3%, by weight, total nonvolatile solids and a pigment to binder ratio of 0.3 is measured for viscosity using a Brookfield Digital Viscometer (Model RVTD) at 10 rpm, spindle #3, at 23° C., expressed in centipoises.

After letdown of the millbase and paint preparation, a masstone paint panel (10 cm × 15 cm. 10 gauge aluminum, gray acrylic primed panel spray painted to visual hiding over a black and white checkerboard) is prepared and dried and 20° gloss is measured with a gloss meter Glossguard System 20/60/85 (Model G67526). The results are noted in the following table.

|  | Viscosity (cps) | Gloss of Masstone |
|---|---|---|
| Untreated gamma-QA pigment | 2,320 | 80 |
| Product of Example I | 670 | 89 |

The improvement in viscosity and gloss is quite evident.

The same pigment and an untreated QA pigment are then incorporated into a color coat/clear coat system, the color coat being a polyester system in which the pigment is dispersed at 20.0%, by weight, concentration with 50.5% total nonvolatile solids and pigment to binder ratio of 0.65 and the clear coat being a thermosetting enamel, the following viscosities (determined as above) being observed at 10 rpm and 50 rpm shear.

|  | Viscosity (cps) | |
|---|---|---|
|  | 10 rpm | 50 rpm |
| Untreated gamma-QA Pigment | 6,780 | 2,664 |
| Product of Example I | 800 | 784 |

It is seen that the pattern of substantial improvement is likewise present in a different coating system.

EXAMPLE II

This example illustrates the benefits derived from the presence of the copolymer.

When Example I is repeated exactly as described but the acetone solution of the copolymer is omitted, the resulting product shows the following performance in alkyd system (a) based on the same measured parameters.

|  | Viscosity (cps) | Gloss of Masstone |
|---|---|---|
| Untreated gamma-QA Pigment | 2,790 | 82 |
| Product of Example II | 1,190 | 83 |

Thus, although the surface treatment with 2-phthalimidomethylQA is helpful in rheological improvement, it is not as effective as the combination of 2-phthalimidomethylQA and the copolymer. The polymeric dispersant allows significant improvement in gloss to be realized.

EXAMPLE III

Isolated and dried gamma QA is pulverized. The same is done separately with 2-phthalimidomethylQA. Dry copolymer is prepared by removal of the xylene/butyl acetate solvent system at 8–10 mm Hg pressure and a temperature of 50°–60° C. and subsequent pulverization. The dry products are then utilized as follows:

A 500 ml. jar is charged with 58.2 parts gamma QA and 2.8 parts 2-phthalimidomethylQA and blended on a two roll mill. Thereafter, 3.6 parts. of copolymer are added and blending continued to uniformity.

The product is evaluated in alkyd system (a) as shown in Example I, and in a second distinct alkyd resin system (b) and the viscosity of the dispersion and 20° gloss of the masstone finish are measured in the noted manner and compared to a sample of untreated gamma QA.

|  | Viscosity (cps) | | Gloss of Masstone | |
|---|---|---|---|---|
|  | Alkyd (a) | Alkyd (b) | Alkyd (a) | Alkyd (b) |
| Untreated gamma-QA Pigment | 2,320 | 1960 | 80 | 72 |
| Product of Example III | 560 | 900 | 89 | 87 |

If instead of 3% 2-phthalimidomethylQA, as shown above, 5% is incorporated without altering the other ingredients, the following results are obtained in alkyd resin (a).

| Pigment of Example III with 5% 2-phthalimidomethylQA | 520 | 89 | — |
|---|---|---|---|

The results show the effectiveness of the combined action of the two treating agents, incorporated in the manner described.

EXAMPLE IV

This example illustrates the benefits obtained from the presence of the pigment derivative dispersant in combination with the copolymer on a quinacridone solid solution.

Three samples are evaluated in an alkyd paint system.

Sample (1) is an untreated, relatively large particle size solid solution consisting of 60.5% quinacridone and 39.5% 4,11-dichloroquinacridone.

Sample (2) is a blend of 26.6 parts of solid solution (1) with 1.6 parts of copolymer (Example I).

Sample (3) is a blend of 26.6 parts of solid solution (1) with 1.6 parts of copolymer (Example I) and 0.82 parts of 2-phthalimidomethylQA.

All blending operations are carried out as described in Example III.

The measured parameters are shown below.

|  | Viscosity (cps) | Gloss of Masstone |
|---|---|---|
| Sample (1) | 720 | 70 |
| Sample (2) | 570 | 95 |
| Sample (3) | 60 | 95 |

Although the presence of the copolymer affords improvement in masstone gloss, it is to be noted that the combination with 2-phthalimidomethylQA and copolymer provides dual benefits, i.e. a drastic reduction in viscosity with maintenance of a high masstone gloss.

EXAMPLE V 227 parts gamma QA treated with about 4%, by weight, QA monosulfonic acid in dry form are blended with 136.2 parts copolymer in a 2-liter plastic bottle by rotating on a two roll mill for 30 minutes. The above blend is then, in turn, blended with 2043 parts of gamma QA treated with about 4% QA monosulfonic acid in dry form in a 19 liter container on a two roll mill for one hour.

The resulting product is evaluated in alkyd systems (a) and (b). The results are shown below compared to a product which is devoid of copolymer but is otherwise identical.

|  | Viscosity (cps) | | Gloss of Masstone | |
|---|---|---|---|---|
|  | Alkyd (a) | Alkyd (b) | Alkyd (a) | Alkyd (b) |
| Gamma QA Pigment Treated with 4% QA Monosulfonic Acid | 1,900 | 1010 | 84 | 72 |
| Product of Example IV | 570 | 920 | 88 | 89 |

EXAMPLE VI

The following mill bases are prepared according to the method as described in Example I, i.e. the pigment or pigment mixture is incorporated in conventional manner in an alkyd paint system (®Setal 84; solids content: 70% by weight).

Mill base A: alkyd paint system containing an untreated pigment 1,4-diketo-3,6-di-(4-chlorophenyl)-pyrrolo)-pyrrolo-[3,4-c]-pyrrole (see U.S. Pat. No. 4,579,949), but without any other additive in the alkyd paint system.

Mill base B: alkyd paint system containing a pigment mixture consisting of 98%, by weight, of 1,4-diketo-3,6-di-(4-chlorophenyl)-pyrrolo-[3,4-c]-pyrrole and 2%, by weight, of the calcium salt of 1,4-diketo-3-(4'-chlorophenyl)-6-phenylpyrrolo-[3,4-c]-pyrrole-4''-sulfonic acid and additionally 15%, by weight based on dry pigment mixture, of dry copolymer (Example I).

The flow properties of the mill base containing 12%, by weight, of pigment and 54%, by weight, of total solids, and whose pigment/binder ratio is 0.3, are determined with HAAKE viscosimeter (Rotovisco RV12; measuring temperature: 25° C., measuring system: SV-SP, shear range: D=0-100 [1/s]). For simple characterization of the flow curves, viscosity values at D=10 [1/s]and 100 [1/s], calculated from optimum regression curves, can be cited.

The following viscosity values are determined
for the mill base A
at D=10 [1/s]: 605 mPa . s
at D=100 [1/s]: 280 mPa . s
for the mill base B
at D=10 [1/s]: 249 mPa . s
at D=100 [1/s]: 181 mPa . s Preparation of the pigment mixture for mill base B (a) 5.0 parts of 1,4-diketo-3-phenyl-6-(4'-chlorophenyl)-pyrrolo-[3,4-c]-pyrrole are added at 2° to 5° C. over 10 minutes to a mixture of 40 parts of fuming sulfuric acid (25% content of SO₃) and 40 parts of sulfuric acid monohydrate. The mixture is stirred for ½ hour at 5° C. and then for 17 hours at 20° C., and subsequently poured onto ice-water to prepare 420 parts of mixture which is mixed with 30 parts of sodium chloride at 70°-75° C. and stirring is continued for 1 hour at the same temperature. After cooling the mixture to 20° C., the precipitate is isolated by filtration, washed with 5% sodium chloride solution until free of acid and dried at 120° C., affording 6.4 parts of the sodium salt of the monosulfonic acid of 1,4-diketo-3-phenyl-6-(4'-chlorophenyl)-pyrrolo-[3,4-c]-pyrrole, taking into account the content of sodium chloride.

(b) 20 parts of 1,4-diketo-3,6-di-(4-chlorophenyl)-pyrrolo-[3,4-c]-pyrrole are stirred in the form of the moist filter cake in a small amount of deionized water. The whole is made up to 600 ml with water and stirred for 1 hour at room temperature. To the mixture is then added a solution of 0.59 parts of the sodium sulfonate obtained in (a) in 200 ml of water and the batch is stirred for 1 hour at room temperature. A solution of 5 parts of CaCl₂ in a small amount of water is added and the mixture is heated to 75° C. The mixture is maintained for 1 hour at this temperature, then cooled to room temperature and filtered. The filter residue is washed with water and dried overnight in a vacuum cabinet at 120° C., to give a mixture consisting of the compounds of the formulae

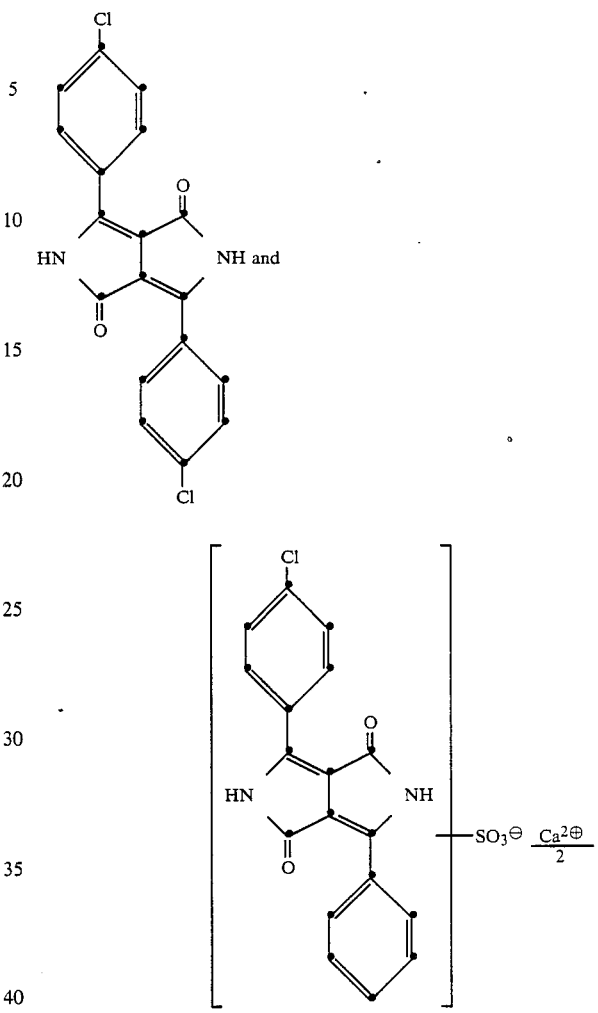

in the ratio of about 98.2 parts by weight.

Summarizing, it is seen that this invention provides modified pigment compositions with significantly improved rheological, gloss and distinction of image properties. Variations may be made in proportions, procedures and materials without departing from the scope of the invention as defined by the following claims.

What is claimed is:

1. A pigment composition comprising an organic pigment, from about 1 to 10%, by weight of a derivative of said pigment which acts on the surface of the organic pigment to improve the dispersion thereof and from about 3 to 20%, by weight of said pigment, of a substantially solvent-free, basic, nitrogen-containing copolymer of the polyurethane series.

2. The composition of claim 1, wherein said organic pigment is a quinacridone or a substituted quinacridone or a solid solution of quinacridones.

3. The composition of claim 2, wherein said quinacridone is gamma-quinacridone.

4. The composition of claim 1, wherein said organic pigment is a 1,4-diketo-pyrrolopyrrole.

5. The composition of claim 1, wherein said nitrogen-containing polymer of the polyurethane series is the product resulting from the reaction of a polyisocyanate with an average of 2.5–6 functional groups with (a) an aliphatic or cycloaliphatic monohydroxy compound or an ether- or carboxy-substituted aliphatic, cycloaliphatic or aromatic monohydroxy compound in a concentration sufficient to react with 15-50% of the NCO groups;

(b) a polymeric hydroxy or amino compound of the formula $$G-(E)_n$$

wherein
E is —OH, —NH$_2$ or —NH(C$_1$-C$_4$ alkyl), n is 2 or 3, and G is an aliphatic, cycloaliphatic or aromatic group optionally containing —O—, —COO—, —CONH—, —S— or —SO$_2$— groups, in an amount to convert an additional 15-45% of the NCO groups; and (c) a compound of the formula $$Z-Q$$

wherein
Q is —OH, NH$_2$, —NH(C$_1$-C$_4$ alkyl) or —SH, and Z is a C$_2$-C$_{10}$ aliphatic group with at least one tertiary amino group or a heterocyclic group with at least one basic ring nitrogen not attached to a hydrogen atom, optionally linked to Q through a C$_1$-C$_{10}$ alkylene group, to the elimination of all NCO groups.

6. The composition of claim 5, wherein said copolymer has an amine value ranging from 5-15 mg. KOH/g.

7. The composition of claim 1, wherein said derivative is a phthalimidomethyl or sulfonic acid derivative of said pigment.

8. The composition of claim 2, wherein said dispersion improving derivative is a phthalimidomethyl or sulfonic acid derivative of said quinacridone.

9. The composition of claim 4, wherein said dispersion improving derivative is a sulfonic acid derivative of said 1,4-diketo-pyrrolopyrrole.

10. The composition of claim 1 which comprises gamma-quinacridone, 2 to 6% of a 2-phthalimidomethyl derivative of quinacridone and 5 to 10% of said copolymer having an amine value of from 10-12 mg. KOH/g, said percentages being based on the weight of pigment.

11. The composition of claim 1 which comprises gamma-quinacridone, 2 to 6% of a sulfonic acid derivative of quinacridone and 5 to 10% of said copolymer having an amine value of from 10-12 mg. KOH/g., said percentages being based on the weight of pigment.

12. A process for improving the rheological and stability characteristics of an organic pigment dispersion and the gloss and distinctness properties of a finish prepared therefrom which comprises applying to the surface of said organic pigment from about 3 to 20% of a substantially solvent-free, basic, nitrogen-containing copolymer of the polyurethane series and from about 1 to 10% of a derivative of said pigment which acts on the surface of the organic pigment to improve the dispersion thereof, said percentages being based on the weight of pigment.

13. The process of claim 12, wherein said nitrogen-containing polymer of the polyurethane series is the product resulting from the reaction of a polyisocyanate with an average of 2.5-6 functional groups with (a) an aliphatic or cycloaliphatic monohydroxy compound or an ether- or carboxy-substituted aliphatic, cycloaliphatic or aromatic monohydroxy compound in a concentration sufficient to react with 15-50% of the NCO groups;

(b) a polymeric hydroxy or amino compound of the formula $$G-(E)_n$$

wherein
E is —OH, —NH$_2$ or —NH(C$_1$-C$_4$ alkyl), n is 2 or 3, and G is an aliphatic, cycloaliphatic or aromatic group optionally containing —O—, —COO—, —CONH—, —S— or —SO$_2$— groups, in an amount to convert an additional 15-45% of the NCO groups; and (c) a compound of the formula $$Z-Q$$

wherein
Q is —OH, NH$_2$, —NH(C$_1$-C$_4$ alkyl) or —SH, and Z is a C$_2$-C$_{10}$ aliphatic group with at least one tertiary amino group or a heterocyclic group with at least one basic ring nitrogen not attached to a hydrogen atom, optionally linked to Q through a C$_1$-C$_{10}$ alkylene group, to the elimination of all NCO groups.

* * * * *